United States Patent [19]

Jinguji et al.

[11] 3,806,649

[45] Apr. 23, 1974

[54] COMMUNICATION SWITCHING SYSTEM PROVIDED WITH VIDEO SIGNAL GENERATING MEANS

[75] Inventors: Jun Jinguji, Tokyo; Takao Nakano; Tadahiko Akiyama, both of Yokohama; Hiroyuki Nakano, Hatano, all of Japan

[73] Assignees: Hitachi, Ltd.; Nippon Telegraph and Telephone Public Corporation, both of Tokyo, Japan

[22] Filed: Jan. 19, 1972

[21] Appl. No.: 218,976

Related U.S. Application Data

[63] Continuation-in-part of Ser. No. 881,131, Dec. 1, 1969, abandoned.

[52] U.S. Cl........... 179/2 TV, 179/18 B, 179/16 EC
[51] Int. Cl. .......................................... H04m 11/08
[58] Field of Search........... 179/2 TV, 2 DP, 16 EC, 179/18 EA, 18 E, 18 AH, 18 B; 178/DIG. 13, 6, 8

[56] References Cited

UNITED STATES PATENTS

| | | | |
|---|---|---|---|
| 3,335,226 | 8/1967 | Michael | 179/2 DP |
| 3,597,544 | 8/1971 | Kennedy | 179/2 DP |
| 3,649,759 | 3/1972 | Buzzard | 179/15 A |
| 3,587,053 | 6/1971 | Horzepa | 178/68 |

*Primary Examiner*—Kathleen H. Claffy
*Assistant Examiner*—Thomas D'Amico
*Attorney, Agent, or Firm*—Craig and Antonelli

[57] ABSTRACT

In a data communications system comprising a communication switching network including a data processing means, and terminal equipment connected to said communication network through transmission channels, wherein coded data available from said data processing means is displayed as a picture on said terminal equipment, a video information transmission system comprising said communication switching network including means for receiving said coded data, and means for repeatedly transmitting coded data or video signal converted from said coded data through a switching equipment to said terminal equipment at a period of time required to retrace said picture.

3 Claims, 3 Drawing Figures

COMMUNICATION SWITCHING SYSTEM PROVIDED WITH VIDEO SIGNAL GENERATING MEANS

CROSS REFERENCE TO THE RELATED APPLICATION

This application is a Continuation-in-Part of the U.S. Ser. 881,131 filed on Dec. 1, 1969 now abandoned.

BACKGROUND OF THE INVENTION

1. Field of the Invention

This invention relates to a data communications system adopted mainly for man-machine communications including picture displaying terminal equipment for producing a character display or graphic display, and more particularly it pertains to a system for simplifying the picture displaying terminal equipment to thereby make it possible to economically construct the entire system.

2. Description of the Prior Art

Various types of on-line data communications systems have recently been put into practical use and a wide variety of terminal equipment has concomitantly been adopted for such various systems.

Among such terminal equipments, those related to character display and graphic display have become spot-lighted to meet the demands of the times for man-machine communications.

In conventional terminal equipment of this type, however, means for receiving data transferred thereto from data processing means (referred to as electronic computer hereinafter) through transmission channels and means for visually displaying the data on a cathode ray tube are so complicated that the system turns out to be expensive, and therefore a limitation is imposed on the demands therefor.

In the terminal equipment for character display presently in use, the data transmission code (for example, ISO code) which is transmitted at a speed, for example, of 2400 Baud at most through audio transmission channels is stored in the storage means of the equipment by an amount corresponding to one picture frame, and then the data is read out of the storage means at a high speed by means of a read-out control means so as to be converted to a high-speed and wide band video signal through a character pattern converter means, thus resulting in a picture display.

With the foregoing arrangement, it is necessary to provide the data transmission code storage means and character pattern converter means in each individual terminal equipment. Another disadvantage is that since the received data is once stored in the storage means, the presence of any error in the stored data results in a display of erroneous information, so that it is required to make a precise error check during reception of the data transmission code, thus resulting in the arrangement becoming extremely complicated and bulky.

SUMMARY OF THE INVENTION

It is an object of the present invention to provide a video communication system wherein a means to receive and transmit data by checking precise errors in connection with a central data processing means, a means to store data received from the central data processing means and/or remote terminal equipments, a means to transmit stored coded data as they are, or by converting them to video pattern signals against the remote terminal equipments preventing flicker, are concentrated in the switching equipments which are one part of a communication switching network, and to provide economical video information transmission signals by using commonly these means against both a lot of central data processing equipments and remote terminal equipments.

According to the present invention, not only the terminal display equipment can be greatly simplified as compared with the conventional one but also the system can be economically constructed since the aforementioned functions of the remote terminal equipments are concentrated in the switching equipment and operable in common to the many remote terminals connected to separate transmission lines. Furthermore, the number of simultaneous operations of the abovementioned functions which operate association with the remote terminal equipments is considerably smaller as compared with the number of the remote terminal equipments incorporated in the system in accordance to the traffic quantity of the remote terminal equipments, so that the number of those equipments providing the aforementioned functions (hereinafter those equipments are called video signal apparatus) can be made less than the actual number of the remote terminal equipments. This also constitutes a great economic advantage.

Furthermore, according to the present invention, as each of the plural video signal apparatus is available to plural remote terminal equipment connected to separate lines, even if some of the video signal apparatus breaks down, only the grade of services, such as delay can be reduced. That is, the specific remote terminal equipment or its group does not become unusable due to the breakdown such as in the former method corresponding to the video signal and if one or a group of the remote terminal equipments does so.

Still furthermore, when the present invention is applied to an existing telephone switching network, since a wide band video signal which usually requires several MHz band width can be transmitted along the subscribers' metallic cables, the existing telephone switching network can advantageously be utilized substantially without modifying it, providing the video signal apparatus equipped with a character pattern converting function in the nearest switching offices from the subscribers, local telephone offices included in the telephone switching network.

DESCRIPTION OF THE PREFERRED EMBODIMENT

Figure 1:
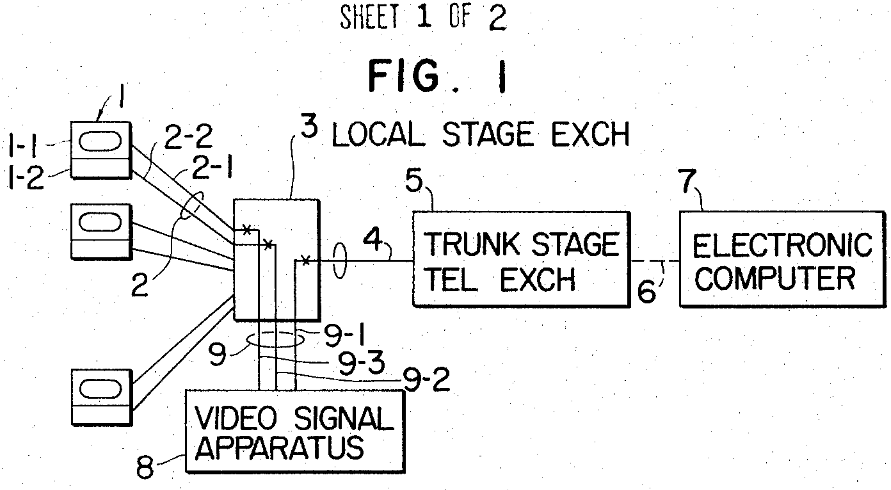
FIG. 1 is a block diagram showing the arrangement of a communications system to which the present invention is applied.

Referring to FIG. 1, numeral 1 represents remote terminal equipment each comprising a displaying unit 1-1 and a multi-frequency signals telephone set 1-2. Numeral 2 indicates subscribers' lines of the four wire type each containing two pairs of wires, video transmission wires 2-1 and audio transmission wires 2-2 per terminal equipment. Numeral 3 denotes a local stage telephone exchange, 4 a trunk line, 5 a toll telephone exchange 6, a trunk line connecting a central electronic computer 7 with the telephone exchange 5, 8 a video signal apparatus embodying the present invention provided in the local telephone exchange 3, and 9 lines connecting the video signal apparatus with the exchange 3.

Figure 2:
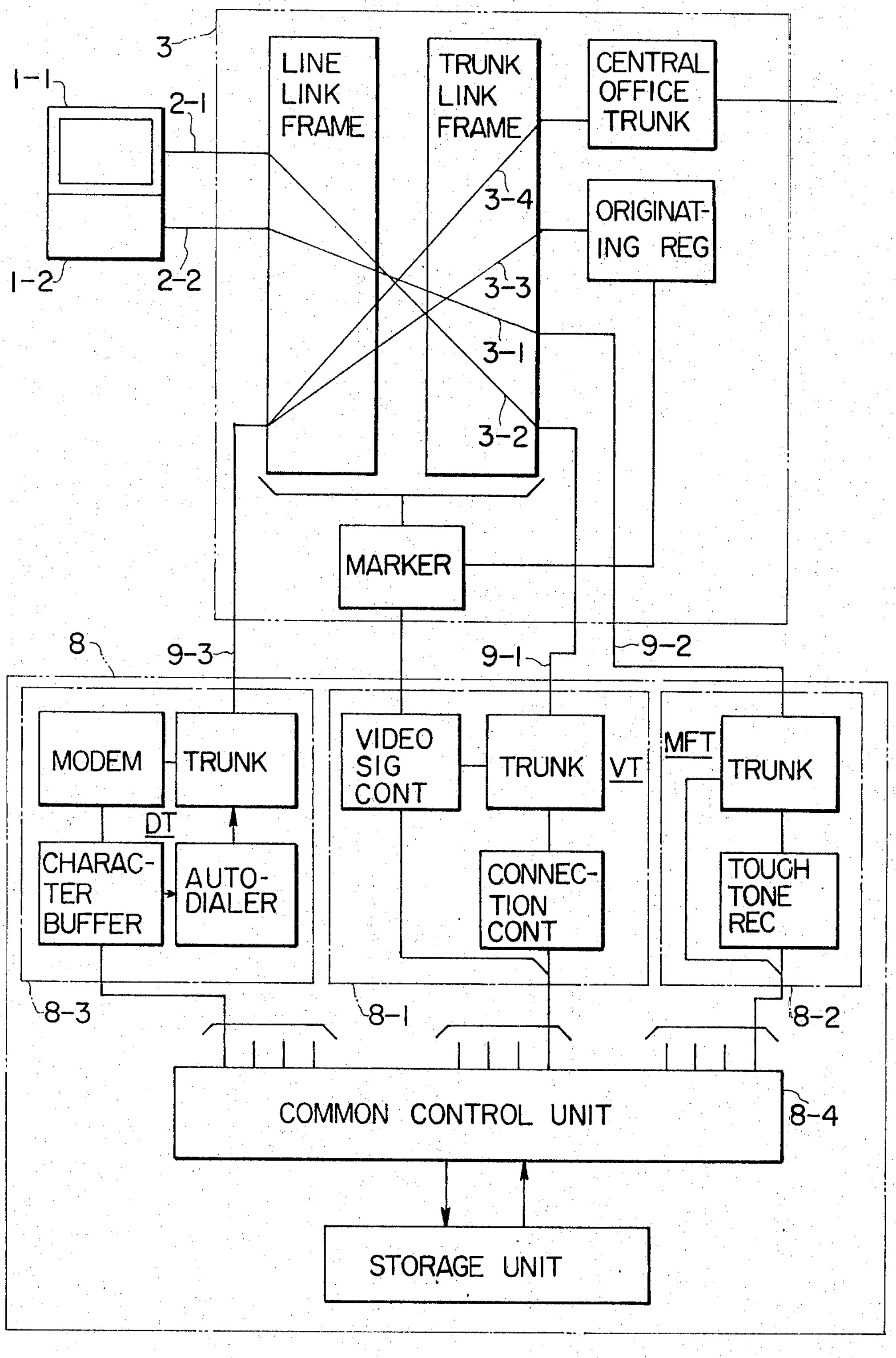
FIG. 2 is a block diagram showing in detail a portion of FIG. 1 useful for explaining the present invention.

FIG. 2 is a block diagram showing the video signal apparatus 8 shown in FIG. 1, wherein 8-1 indicates a video trunk equipment (VT) for connecting the video transmission wires 2-1 for the picture displaying units 1-1 of the remote terminal equipment 1 through the local telephone exchange 3 and from which a signal is transmitted to the picture receiving-displaying unit 1-1 of the remote terminal equipment, and 8-2 a multi-frequency trunk equipment (MFT) adapted to receive data represented by a multi-frequency signal in the audio frequency range provided by the telephone set 1-2 of the remote terminal equipment 1.

8-3 indicates a data communication trunk equipment (DT) for data transmission with respect to the central electronic computer, 8-4 a common control unit of the video signal apparatus by which the aforementioned various trunks 8-1 to 8-3 are controlled in common, and 8-5 a storage unit.

The present invention provides a high-degree transmission control system performing data transmission by employing some particular codes for transmission control defined by the system, such as, a code STX denoting "start of a text" of data transmission messages, a code ETX denoting "end of a text" of data transmission messages, a code ACK, employed to acknowledge that a received text is correct, a code NAK denoting "negative acknowledgement" that the received text is incorrect, the symbol EOT denoting "end of transmission text," a symbol ENQ denoting "enquiry" of the condition of another office, a code for synchronism as needed, and some particular codes for appraising another party of one's own particular condition.

Furthermore, the present invention also provides a means for making an error check of signals transmitted and received by adding redundancy in the system where necessary.

For data communications between the video signal apparatus 8 and the remote terminal equipment, data transmission from the remote terminal equipment 1 is effected by means of multi-frequency signal, without employing any other special transmission control procedures than the technique of the well-known multi-frequency signal system. Transmission of video information from the video signal apparatus to the terminal equipment, on the other hand, is achieved by merely sending a wide-band video signal out of the video trunk 8-1, without using any special communication control procedures for data protection, other than synchronizing signals.

When, at one of the terminal equipments 1, a calling operation is performed and dialing is made to call the central electronic computer, the exchange 3 is caused to select and seize a free one of the respective trunks 8-1, 8-2 and 8-3 of the video signal apparatus 8 so as to extend the connection through the trunk line 4, the toll exchange 5 and the trunk line 6 to the electronic computer 7. These connecting operations are achieved through a process similar to the well-known one in the telephone network.

Hereinbelow will be explained in detail by means of FIG. 2, a procedure of desired connection through a telephone exchange 3, especially a common control crossbar-type exchange.

When a call is originated at a multi-frequency signal telephone set 1-2 of a terminal equipment 1, a marker, a common control equipment, is activated in the telephone exchange 3.

After the marker identifies that the call is originated from a video terminal equipment, the marker seizes one of the free multi-frequency trunks 8-2 and connects the calling line 2-2 to the trunk part of the multi-frequency trunk (MFT) 8-2 via a route 3-1 in FIG. 2.

When a caller dials the directory number of a central electronic computer, the dialed number is received by a multi-frequency signal receiver of MFT8-2. At the time of the connecting operation, the calling number and the called number are transferred from the marker to the trunk part of the MFT8-2. The calling number and the called number transferred to the MFT8-2 are also transferred to a common control unit 8-4 immediately. The common control unit 8-4 transfers the called number to the auto-dialer unit of one of free data communication trunks and the calling number to the control equipment of one of the free video trunks VT8-1 respectively, and memorizes the identifications of the calling number and the video trunk 8-1, and of the multi-frequency trunk 8-2 and a data communication trunk 8-3.

The connection control equipment of the video trunk to which the calling number is transferred immediately activates a marker of the telephone exchange 3, and then transfers the calling number to the marker. The marker connects the trunk part of the video trunk VT8-1 and the video line 2-1 of the calling terminal equipment obtained by a calling number by means of the transferred calling number as the same method shown in a channel 3-2 in FIG. 3.

On the other hand, the auto-dialer part of the data communication trunk 8-3 to which the called number is transferred from a common control unit 8-4, activates the trunk part immediately. Then, the marker is activated. However, after discriminating that the call is from the data communication trunk 8-3, the marker seizes one of free originating registers and connects via a route 3-3 in FIG. 2.

After completion of this connection, the autodialer sends out the called number to the originating register through the trunk part. Then, the marker is activated by the originating register and releases a connection between the data communication trunk 8-3 and the originating register, and at the same time completes a connection to a central office trunk via a route 3-4. Thereafter, a sender which is not shown is activated in a telephone exchange as required and connected to a central electronic computer 7 through the same process as an ordinary telephone toll call.

Upon completion of the above connection, a communication between the data communication trunk 8-3 and the central electronic computer 7 will be started in accordance with a transmission control process defined as a high-degree system for data protection.

This transmission control process is adopted when a connection of lines is completed between the central electronic computer and a video signal apparatus installed at a local telephone exchange equipment and data are transmitted. The process necessary for the control depends upon a communication control device and a transmission control program which is considered as a known prior art in a central electronic computer system.

On the other hand, in a video signal apparatus there are provided the processes at a data communication trunk 8-3, a common control unit 8-4 and a storage unit 8-5 in FIG. 2.

Hereinbelow will be explained in detail the transmission control process.

The process is controlled in accordance with the flow chart and each part of the process is watched opportunely, and each mark is parity-checked. Furthermore, mutualization between a code STX denoting "start of a text" of data transmission messages and a code ETX denoting "end of a text" of data transmission messages of a text is checked, and also the text is checked by a horizontal parity code BCC, and when these checks are all correct, the signals are correctly transmitted.

Figure 3:
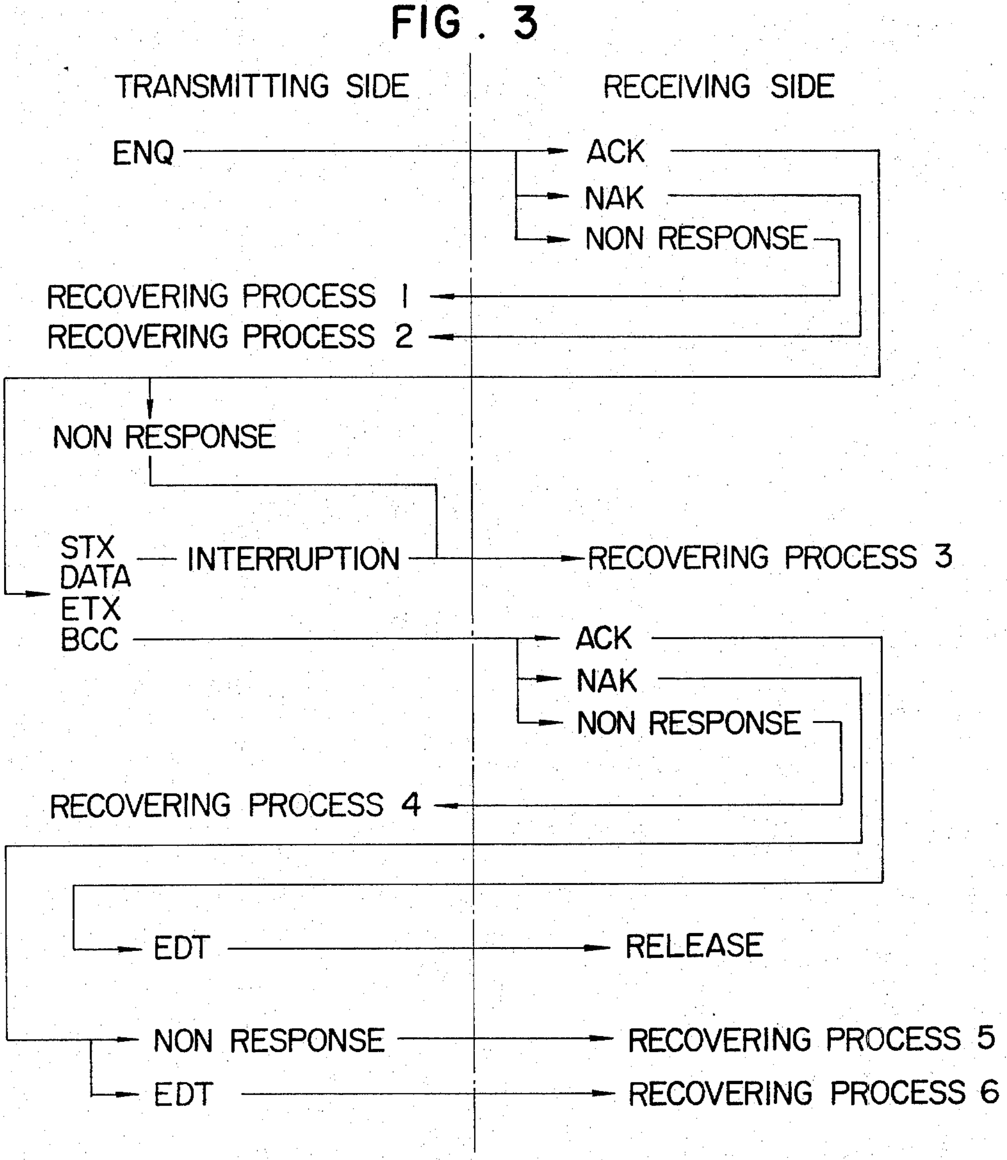
FIG. 3 is a flowing chart of the processes of an error check and a transmission control procedure check of the present invention.

The above process is explained in accordance with a flow chart shown in FIG. 3.

In FIG. 3,

1. Recovering process 1 discriminates non response and starts recovering process.

2. Recovering process 2 discriminates that the receiving condition of the receiving side is not yet repaired, and informs that it is impossible to send out any information against the former stage (place where the information data are produced), and then releases.

3. Recovering process 3 discriminates that data is not transmitted by a timer of receiving side after a limited time and a data transmission is maintained interrupted, and releases.

4. Recovering process 4 discriminates that any response against a data transmission by a timer of transmitting side is not obtained after a limited time and informs the former stage that a normal data transmission cannot be performed and then releases.

5. Recovering process 5 discriminates that a receiving side demands resending after checking of incorrect data and that any data is not resent out after a predetermined period, and releases.

6. Recovering process 6 discriminates that a receiving side demands resending after checking of incorrect data and the information of stopping the transmission from the sending side is received and, then releases.

The data from the central electronic computer 7 is received by the video signal apparatus at the data communication trunk 8-3 thereof and then stored in the storage unit 8-5 after having been subjected to the above-mentioned error check and transmission control procedure check. If no error is present in the data, then the data is converted to a video signal by the control circuit 8-4, and thereafter re-stored in the storage unit 8-5. The video signal stored in the storage unit 8-5 is read out at a suitable cyclic period so as to be transmitted as a wide band video signal to the remote terminal equipment 1 through the video trunk VT8-1 and displayed on the displaying unit 1-1. At this point, the video signal is repeatedly transmitted at a speed corresponding to several 10 frames per second as in the case with the ordinary television system. At the remote terminal equipment 1 side, demand for required data is effected by the multi-frequency signal after the reception of the data from the central electronic computer displayed as a picture. At this point, in order to confirm the contents of the multi-frequency signals information, in the video signal apparatus 8, the transmission of the video signal corresponding to the data received from the central electronic computer which has been transmitted through video trunk VT8-1 is interrupted when data is received by the multi-frequency trunk equipment (MFT) 8-2 and stored in the storage unit 8-5, and the received data from the remote terminal equipment 1 is read out of the storage unit 8-5 so as to be transmitted as a video signal to the remote temminal equipment 1 from the video trunk VT8-1. Thus, at the remote terminal equipment 1, it is possible to confirm the data sent by the multi-frequency signal as a picture. After the foregoing confirmation has been achieved, the information to proceed with the operation is transmitted from the remote terminal equipment 1 to the video signal apparatus 8 by means of the multi-frequency signal. When information indicating the end of a transaction is received by the video signal apparatus 8, the data from the remote terminal equipment 1 which has been stored in the storage unit 8-5 is transmitted to the central electronic computer through the data trunk 8-3 in accordance with the transmission control procedures. The necessary data processing is performed by the central electronic computer in accordance with the content of the data. As a result, the output data from the electronic computer is transmitted to the video signal apparatus 8 as in the case of the aforementioned data communications, and it is then transmitted as a video signal from the video signal apparatus 8 to the remote terminal equipment 1 so as to be displayed as a picture on the picture displaying unit 1-1.

In order to terminate the communications with the electronic computer 7 at the remote terminal equipment 1, the DC loop of the subscriber's circuit is cut off by hanging on the handset of the multi-frequency signal telephone set 1-2 so that the telephone exchanges and communication channel to the electronic computer 7 are cleared, as in the case of an ordinary telephone switching.

In the foregoing embodiment, the video data transmitted from the video signal apparatus to the terminal equipment takes the form of a wide band video signal, and at the terminal equipment, received data is displayed directly on a cathode ray tube. However, it is also possible that data provided by the video signal apparatus may be repeatedly sent out in the form of not a video signal but a coded signal, so that the data is converted to a video signal by the video pattern converting means in the displaying unit of the terminal equipment so as to be displayed as a picture.

What is claimed is:

1. A communication switching system comprising:

telephone exchange equipment including a selectively operable switching system;

a plurality of subscriber terminal units each comprising a telephone set and a video displaying unit;

a plurality of subscriber lines one for each subscriber terminal unit each comprising an audio transmission line and a video transmission line connecting said subscriber terminal units to said telephone exchange equipment;

video trunks selectively connected to said subscriber lines through said switching system by said telephone exchange equipment;

data communication trunks connected to said telephone exchange equipment;

communication trunk lines selectively connected at one end to said data trunks through said switching system by said telephone exchange and at the other end to a telephone switching network comprising a toll telephone exchange;

central data processing means connected to said communication lines via said toll telephone exchange;

storage means including means for storing coded data transmitted from said central data processing means to said data trunks via said communication lines, said storage means being connected to said data trunks through a common control means to receive said coded data;

said common control means being connected to said exchange equipment through said video trunks and said data communication trunks for reading out the stored coded data from said storage means, changing the coded data having been read out into a video signal and sending said video signal to said video trunks repeatedly at a cycle corresponding to the period of retrace in said displaying unit in said subscriber terminal units, said displaying unit including means for receiving said video signal and means for displaying said video signal.

2. A video communication system according to claim 1, characterized in that said subscriber terminal units further include means for transmitting question information, said means being connected to said telephone exchange equipment through other subscriber lines and question information receiving trunks connected to other subscriber lines through said telephone exchange equipment, and means in which said question information received by said question information receiving trunks is stored in said storage means and sent to said data trunks.

3. A video communication system according to claim 2, characterized in that means is provided for converting said question information to video information of a video pattern, to be sent to said video trunks corresponding to the number of refresh frames.

* * * * *